E. A. Rock Valve.

4043

REISSUED JUN 21 1870

Witnesses:
Thos Tusche
J. A. Shaw

Inventor.
E. A. Rock
per Munn & Co
Attorneys

United States Patent Office.

THE ROCK VALVE MANUFACTURING COMPANY, OF LUDLOW, VERMONT, ASSIGNEE OF EDWARD A. ROCK.

*Letters Patent No.* 74,144, *dated February* 4, 1868; *reissue No.* 4,043, *dated June* 21, 1870.

IMPROVEMENT IN GLOBE STEAM-VALVES.

The Schedule referred to in these Letters Patent and making part of the same.

*To all whom it may concern:*

Be it known that EDWARD A. ROCK, of Ludlow, in the county of Windsor and State of Vermont, did invent a new and improved Valve; and we do hereby declare that the following is a full, clear, and exact description thereof, which will enable others skilled in the art to make and use the same, reference being had to the accompanying drawing forming part of this specification.

The object of this invention is to form a valve for the stoppage and passage of steam, water, or gas, or other fluids, in such a manner that the constant use of the same shall not injure the joint, or cause the valve to leak; and The invention consists chiefly in the arrangement of an upright curved spring plate, which constitutes the valve, and which, when forced upon the seat, is expanded, as hereinafter more fully described.

Similar letters of reference indicate corresponding parts.

Figure 1:
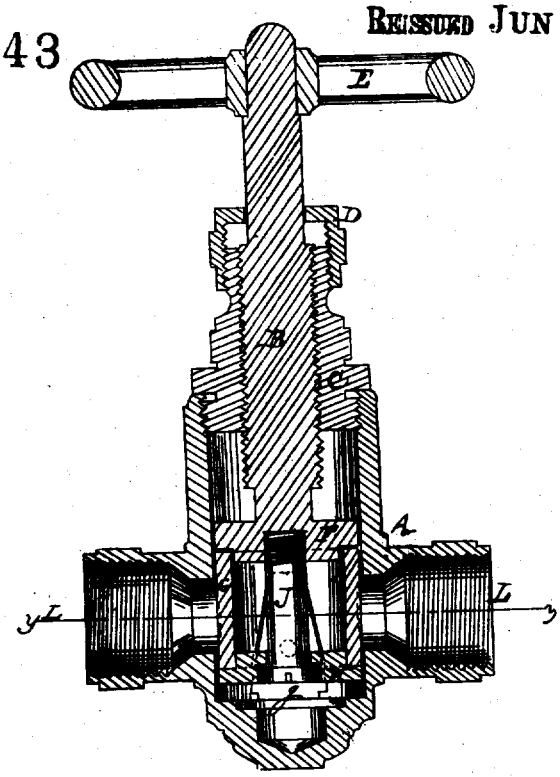
Figure 1 represents a longitudinal section of the valve, taken on the plane of the line *x x*, fig. 2.
Figure 2:
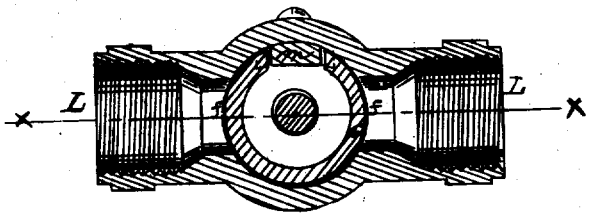
Figure 2 is a cross-section of the same, on the line *y y* of fig. 1.

A represents the shell of the valve.

B is the valve-stem.

C is the nut through which the valve-stem passes, and by which the valve is operated.

D is a stuffing-box around the valve-stem.

E is the hand-wheel.

F is a disk, permanently attached to the end of the valve-stem.

G is the ring-valve, fitted around a shoulder on the disk F, and held in place by a loose washer, H, and a screw, J, which enters the stem by a screw-thread, as seen in the drawing.

The drawing represents the valve as closed.

The pipes which convey the liquid or fluid are attached to the shell at L L.

*m* represents a wedge, which is attached to the shell at one side of the seat, with its point or narrow end up or pointing toward the valve-stem, that is to say, the valve is made of a bent sheet, the ends of which are not close together, so that it has a spring to yield to outward pressure, and a wedge-shaped piece removed to correspond with the wedge.

It will be seen that the open portion of the ring will be expanded, and that the valve will tightly close the apertures *f f*, when it reaches a point near the bottom of its seat, as seen in fig. 1.

The ring may pass in loosely, and be less in diameter than the seat, but at the right point the wedge will expand it so as to form a tight joint.

Provision is made for any wear, either in the ring or wedge, by a space, *g*, below the ring.

The valve never needs grinding, has a vertical motion only, or does not revolve, and it leaves a clear and unobstructed passage for the flow of the liquid.

The wedge may be entirely dispensed with, if desired.

Having thus described the invention,

We claim as new and desire to secure by Letters Patent—

1. An elastic sheet of metal, bent into a circular shape, but having the ends apart to admit of expansion, and to form a close-seated valve, as described.

2. The combination of the wedge *m*, shell A, and valve G, substantially as herein shown and described.

3. The combination of the ring G and wedge *m*, substantially as herein set forth.

EDWARD A. ROCK.
JAMES S. GILL.
GEO. SNOWDEN REDFIELD.

Witnesses:
HIRAM M. JOHNSON,
NELSON M. PIERCE.